Patented Nov. 9, 1926.

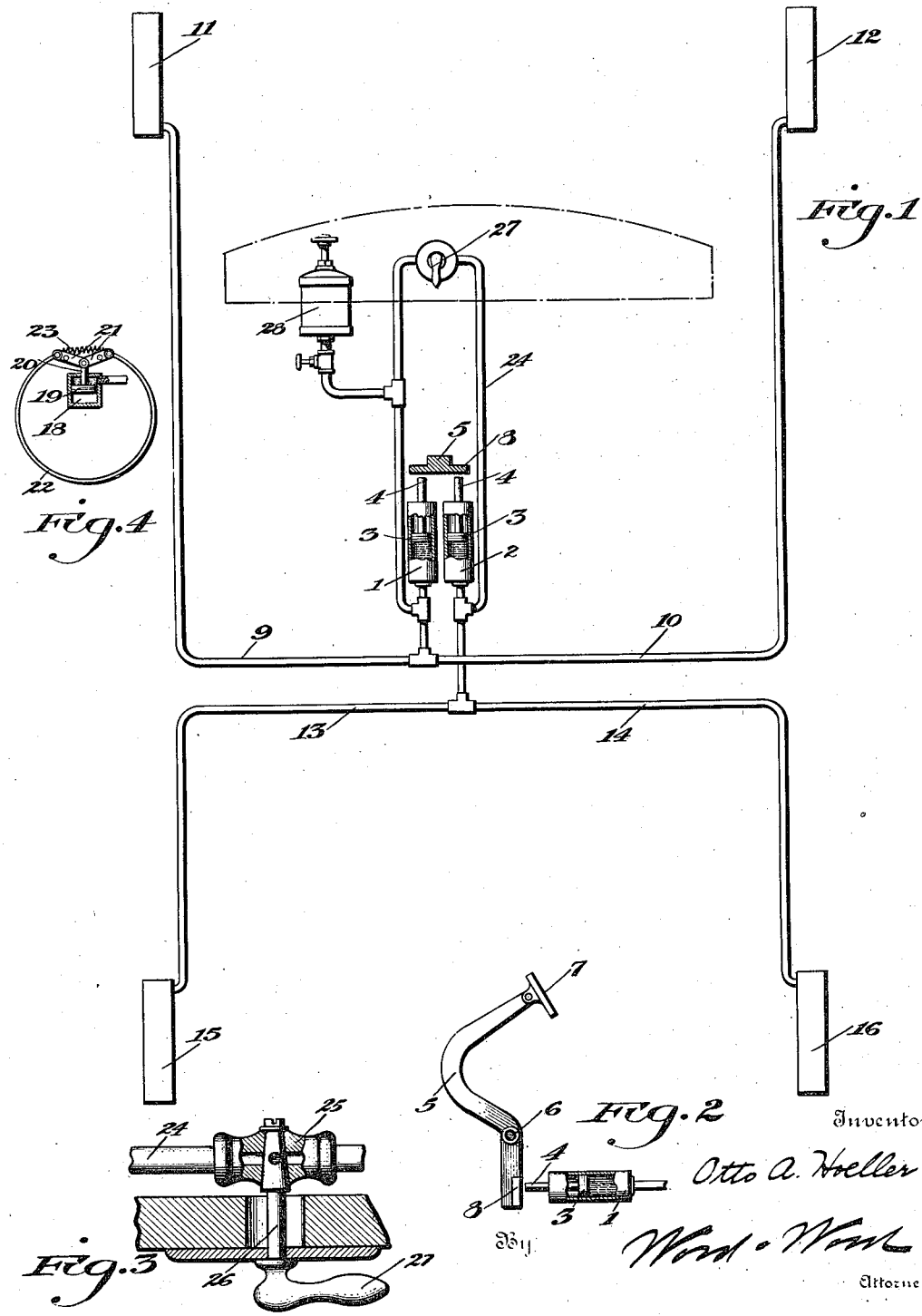

1,606,224

UNITED STATES PATENT OFFICE.

OTTO A. HOELLER, OF CINCINNATI, OHIO.

SYSTEM OF BRAKE CONTROL.

Application filed September 3, 1925. Serial No. 54,377.

This invention relates to a system of hydraulic brake control principally for application to motor vehicles for braking plural sets of wheels and provides for dividing the system into plural units, each unit for operating a set of brakes and having its own pressure cylinder or pump and all cylinders or pumps of the various units of the system operated from a common or single source.

Hydraulic brakes are generally operated by a single cylinder actuated by a control lever, the cylinder connected to each brake by lines of metal pipe or flexible tubing. Since the brakes are all connected to a common cylinder or pump a leak in any one of the lines affects the entire system making it impossible to apply braking pressure in the system and thus disabling all brakes.

An object of the present invention is to provide a system of hydraulic brake control for operating a plurality of brakes having therein means for dividing the system into units, said means consisting of a valve controlled bypass, the control valve mounted within reach from the driver's seat, as on the instrument board and the bypass connecting the braking units, each braking unit consisting of a pressure cylinder connecting with a set of brakes and the various pressure cylinders of the units actuated by a common lever.

Another object is to provide means for governing the fluid quantity in the various units by connecting the units and equalizing the pressure throughout the system.

Other objects and certain advantages will be more fully disclosed in the description of the drawings forming a part of this specification, in which:

Figure 1 is a diagrammatic view showing the improved system of hydraulic brake control as applied to the four brakes of a motor vehicle.

Figure 2 is a diagrammatic view of the control lever and its relation to the pressure cylinders.

Figure 3 is an enlarged detail view of the bypass valve mounted on the instrument board.

Figure 4 is a diagrammatic view of a simple form of hydraulic brake.

The invention is directed primarily to a system of hydraulic brake control, the various elements used therein not being shown in detail to a great extent, and the system being shown as applied to a motor vehicle using four brakes.

Referring to the drawings, two pressure cylinders or pumps 1, 2, are provided having therein pistons 3 and piston rods 4. These pistons are actuated by a control lever 5 pivoted intermediate its ends as at 6 but nearer its lower end to give increased leverage when pressure is applied to the treadle portion 7 thereof for forcing the lower end having the widened base 8 integral therewith, against the ends of the piston rods 4 and actuating the pumps. The control lever is spaced away from the piston ends so as to permit an unobstructed return of the pistons to normal release position.

The lines 9, 10, respectively, connect the cylinder 1 with the forward brakes 11, 12 and the lines 13, 14, respectively, connect the cylinder 2 with the rear brakes 15, 16 for conveying the fluid pressure to the brakes. As shown in Fig. 4 these brakes consist of a cylinder 18, having a piston 19 therein and piston rod 20 connecting the piston to the levers 21 pivotally mounted for drawing the brake band 22 about the brake drum when the piston 19 is actuated and a spring 23 for returning the piston and releasing the brake. The various feed lines may be of any sort of tubing both flexible and metal tubing being commonly used.

A bypass 24 connects both front and rear units and consists of a pipe line connecting the feed lines of both units of the system and extending to the instrument board of the vehicle. A control valve 25 (see Fig. 3) is inserted in the bypass and mounted on the instrument board for convenient operation from the driver's seat. The valve 25 is mounted in the rear of the instrument board and has the stem 26 extending through to the instrument board front and has a handle 27 thereon for operating the valve. A filler tank 28 may connect to the bypass as shown in Fig. 1.

Normally and to insure greater safety with the bypass valve closed the system operates in units each pump operating its set of brakes and both pumps operated by a common lever. If a leak should develop in one of the lines for instance in the rear system the forward brakes would still be operative.

When one unit or set of brakes ceases to function efficiently due to fluid loss resulting in lower braking pressure or when the supply must be replenished throughout the system from the filler tank the bypass valve is opened to permit the fluid to be distributed evenly and the pressure to become equalized throughout the system. With the bypass valve open the system is converted into a single unit for control of all four brakes by one or both cylinders, this or course not being the desirable system of control as described herebefore the valve being opened merely to standardize the pressure throughout the units of the system.

Having described my invention, I claim:

1. A system of hydraulic brake control comprising a plurality of sets of brakes, a pressure applying device for each set of brakes, a lever for actuating said pressure applying devices, a by-pass connecting said pressure applying devices, and a valve in said by-pass for a selective control of the system for operation of the brakes either in sets or as a unit.

2. A system of hydraulic brake control comprising a plurality of sets of brakes, a cylinder for each set of brakes, pistons in said cylinders, a lever for actuating said pistons, a by-pass connecting said cylinders, and a valve in said by-pass for a selective control of the system for operation of the brakes either in sets or as a unit.

In witness whereof, I hereunto subscribe my name.

OTTO A. HOELLER.